US012435398B2

(12) United States Patent
Ishida et al.

(10) Patent No.: US 12,435,398 B2
(45) Date of Patent: Oct. 7, 2025

(54) METAL MAGNETIC PARTICLE, INDUCTOR, METHOD FOR MANUFACTURING METAL MAGNETIC PARTICLE, AND METHOD FOR MANUFACTURING METAL MAGNETIC CORE

(71) Applicant: Murata Manufacturing Co., Ltd., Kyoto-fu (JP)

(72) Inventors: Takuya Ishida, Nagaokakyo (JP); Makoto Yamamoto, Nagaokakyo (JP); Katsutoshi Uji, Nagaokakyo (JP); Yuya Ishida, Nagaokakyo (JP); Mitsuru Odahara, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 0 days.

(21) Appl. No.: 18/583,595

(22) Filed: Feb. 21, 2024

(65) Prior Publication Data

US 2024/0191328 A1 Jun. 13, 2024

Related U.S. Application Data

(62) Division of application No. 17/201,871, filed on Mar. 15, 2021, now Pat. No. 11,965,229.

(30) Foreign Application Priority Data

Mar. 27, 2020 (JP) ................................ 2020-058366

(51) Int. Cl.
*H01F 1/147* (2006.01)
*B22F 1/145* (2022.01)
(Continued)

(52) U.S. Cl.
CPC .............. *C22C 38/02* (2013.01); *B22F 1/145* (2022.01); *B22F 1/16* (2022.01); *B22F 3/02* (2013.01);
(Continued)

(58) Field of Classification Search
CPC ............ H01F 1/14766; H01F 1/14783; H01F 1/14791; H01F 1/20; H01F 1/24;
(Continued)

(56) References Cited

U.S. PATENT DOCUMENTS

| | | | | |
|---|---|---|---|---|
| 11,742,141 | B2 * | 8/2023 | Ishida | H01F 1/33 428/570 |
| 2012/0274438 | A1 | 11/2012 | Hachiya et al. | |
| 2019/0279801 | A1 | 9/2019 | Yoshidome et al. | |

FOREIGN PATENT DOCUMENTS

| | | | |
|---|---|---|---|
| CN | 109119222 | A | 1/2019 |
| CN | 110246651 | A | 9/2019 |

(Continued)

OTHER PUBLICATIONS

Machine translation of CN109119222A. (Year: 2019).*

*Primary Examiner* — Matthew E. Hoban
*Assistant Examiner* — Lynne Edmondson
(74) *Attorney, Agent, or Firm* — Studebaker Brackett PLLC

(57) ABSTRACT

A metal magnetic particle provided with an oxide layer on a surface of an alloy particle containing Fe and Si. The oxide layer has a first oxide layer, a second oxide layer, a third oxide layer, and a fourth oxide layer. Also, in line analysis of element content by using a scanning transmission electron microscope-energy dispersive X-ray spectroscopy, the first oxide layer is a layer where Fe content takes a local maximum value, the second oxide layer is a layer where Fe content takes a local maximum value, the third oxide layer is a layer where Si content takes a local maximum value, and the fourth oxide layer is a layer where Fe content takes a local maximum value.

13 Claims, 2 Drawing Sheets

(51) Int. Cl.

| | |
|---|---|
| ***B22F 1/16*** | (2022.01) |
| ***B22F 3/02*** | (2006.01) |
| ***C22C 38/02*** | (2006.01) |
| ***H01F 1/20*** | (2006.01) |
| ***H01F 1/24*** | (2006.01) |
| ***H01F 1/33*** | (2006.01) |
| *B22F 1/107* | (2022.01) |
| *H01F 27/255* | (2006.01) |

(52) U.S. Cl.

CPC ........... *H01F 1/14766* (2013.01); *H01F 1/24* (2013.01); *B22F 1/107* (2022.01); *B22F 2301/35* (2013.01); *B22F 2302/256* (2013.01); *C22C 2202/02* (2013.01); *H01F 27/255* (2013.01); *Y10T 428/12181* (2015.01)

(58) Field of Classification Search

CPC .......... H01F 1/33; H01F 27/255; H01F 17/04; B22F 1/16; B22F 1/145; B22F 5/006; B22F 3/00; B22F 3/02; B22F 3/004; C22C 2202/02; C22C 38/02

See application file for complete search history.

(56) References Cited

FOREIGN PATENT DOCUMENTS

| | | | |
|---|---|---|---|
| JP | 2011-249774 | A | 12/2011 |
| JP | 4866971 | B2 | 2/2012 |
| JP | 5082002 | B1 | 11/2012 |
| JP | 2014-143286 | A | 8/2014 |
| JP | 2018-011043 | A | 1/2018 |
| JP | 2018-037635 | A | 3/2018 |
| JP | 2019-009307 | A | 1/2019 |
| JP | 2019-160943 | A | 9/2019 |
| JP | 2021-158262 | A | 10/2021 |
| WO | 2016/056351 | A1 | 4/2016 |

* cited by examiner

METAL MAGNETIC PARTICLE, INDUCTOR, METHOD FOR MANUFACTURING METAL MAGNETIC PARTICLE, AND METHOD FOR MANUFACTURING METAL MAGNETIC CORE

CROSS-REFERENCE TO RELATED APPLICATION

This application is a Divisional of U.S. patent application Ser. No. 17/201,871, filed Mar. 15, 2021, which claims benefit of priority to Japanese Patent Application No. 2020-058366, filed Mar. 27, 2020, the entire content of which is incorporated herein by reference.

BACKGROUND

Technical Field

The present disclosure relates to a metal magnetic particle, an inductor, a method for manufacturing a metal magnetic particle, and a method for manufacturing a metal magnetic core.

Background Art

A power inductor to be used in a power supply circuit is required to have a small size, and a low loss, and to deal with a large current, and in order to respond these requirements, it has been studied to use metal magnetic particles having a high saturation magnetic flux density in a magnetic material. The metal magnetic particles have an advantage of having a high saturation magnetic flux density, but since insulation resistance of the material alone is low, it is necessary to ensure insulation between the metal magnetic particles in order to use the metal magnetic particles as a magnetic material of an electronic component. For this reason, various methods for improving insulation properties of the metal magnetic particles have been studied.

For example, Japanese Patent No. 5082002 discloses a method of coating a surface of a metal magnetic particle with an insulating film such as glass. Further, Japanese Patent No. 4866971 discloses a method of forming an oxide layer derived from a material on a surface of a metal magnetic particle.

However, the method described in Japanese Patent No. 5082002 has a problem in that it is difficult to uniformly form an insulating film such as glass on a surface of a metal magnetic particle, and a portion having a thin film thickness serves as a start point of dielectric breakdown.

In addition, the method described in Japanese Patent No. 4866971 has a problem in that insulation reliability is not sufficient because the oxide layer derived from the raw material potentially contains defects. In addition, the metal magnetic material described in Japanese Patent No. 4866971 has a problem in that heat treatment cannot be performed at a high temperature in order to prevent progress of oxidation of the raw material particles.

SUMMARY

Accordingly, the present disclosure provides a metal magnetic particle and an inductor that have excellent insulation properties and direct-current superposition characteristics. The present disclosure also provides a method for manufacturing a metal magnetic particle capable of obtaining a metal magnetic particle having excellent insulation properties and direct-current superposition characteristics, and a method for manufacturing a metal magnetic core capable of obtaining a metal magnetic core having excellent insulation properties and direct-current superposition characteristics.

A metal magnetic particle according to preferred embodiments of the present disclosure is a metal magnetic particle provided with an oxide layer on a surface of an alloy particle containing Fe and Si, the oxide layer includes a first oxide layer, a second oxide layer, a third oxide layer, and a fourth oxide layer from a side of the alloy particle. The first oxide layer is a layer in which Si content takes a local maximum value, the second oxide layer is a layer in which Fe content takes a local maximum value, the third oxide layer is a layer in which Si content takes a local maximum value, and the fourth oxide layer is a layer in which Fe content takes a local maximum value in line analysis of element content by using a scanning transmission electron microscope-energy dispersive X-ray spectroscopy.

An inductor according to preferred embodiments of the present disclosure includes the metal magnetic particles according to preferred embodiments of the present disclosure.

A method for manufacturing a metal magnetic particle according to preferred embodiments of the present disclosure includes mixing a raw material particle having, on a surface of an alloy particle containing Fe and Si, an Si oxide film and an Fe oxide film from a side of the alloy particle with Si alkoxide and alcohol, forming a coating film forming particle formed with a coating film containing silicon oxide by hydrolyzing drying the Si alkoxide, and forming an oxide layer on the surface of the alloy particle by performing heat treatment on the coating film forming particle in an oxidizing atmosphere. An average thickness of the coating film is larger than or equal to 10 nm and smaller than or equal to 14 nm (i.e., from 10 nm to 14 nm).

A method for manufacturing a metal magnetic core according to preferred embodiments of the present disclosure includes mixing raw material particles each of which has, on a surface of an alloy particle containing Fe and Si, an Si oxide film and an Fe oxide film from a side of the alloy particle with Si alkoxide and alcohol, forming coating film forming particles each of which is formed with a coating film containing silicon oxide by hydrolyzing and drying the Si alkoxide, molding the coating film forming particles, and forming an oxide layer on the surface of each of the alloy particles by performing heat treatment on a molded body of the coating film forming particles in an oxidizing atmosphere. An average thickness of the coating film is larger than or equal to 10 nm and smaller than or equal to 14 nm (i.e., from 10 nm to 14 nm).

Other features, elements, characteristics and advantages of the present disclosure will become more apparent from the following detailed description of preferred embodiments of the present disclosure with reference to the attached drawings.

DETAILED DESCRIPTION

Hereinafter, a metal magnetic particle, an inductor, a method for manufacturing a metal magnetic particle, and a method for manufacturing a metal magnetic core according to the present disclosure will be described.

However, the present disclosure is not limited to the following configurations, and can be appropriately changed and applied without departing from the spirit and scope of the present disclosure. Note that a combination of two or more preferred configurations of the present disclosure to be described below is also an example of the present disclosure.

Metal Magnetic Particle

A metal magnetic particle according to preferred embodiments of the present disclosure is a metal magnetic particle provided with an oxide layer on a surface of an alloy particle containing Fe and Si, the oxide layer includes a first oxide layer, a second oxide layer, a third oxide layer, and a fourth oxide layer from a side of the alloy particle, The first oxide layer is a layer in which Si content takes a local maximum value, the second oxide layer is a layer in which Fe content takes a local maximum value, the third oxide layer is a layer in which Si content takes a local maximum value, and the fourth oxide layer is a layer in which Fe content takes a local maximum value in line analysis of element content by using a scanning transmission electron microscope-energy dispersive X-ray spectroscopy.

Figure 1:
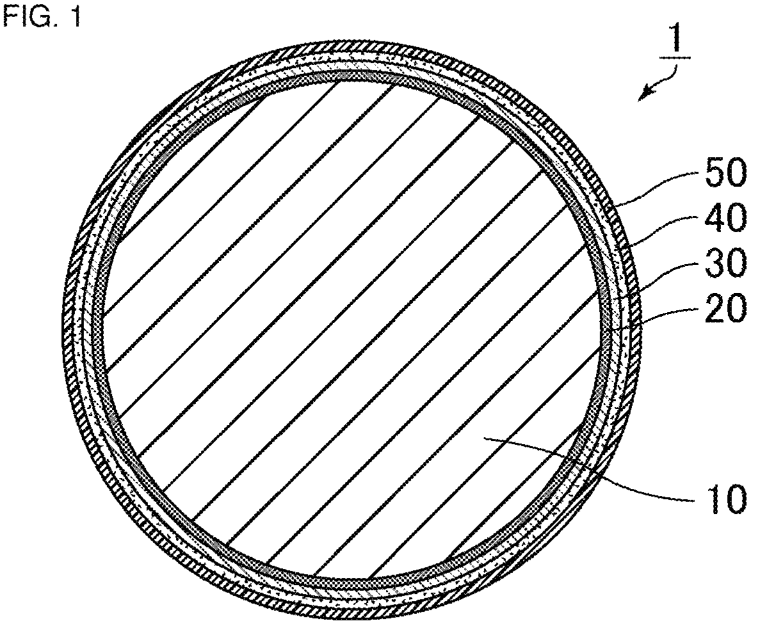
FIG. 1 is a cross-sectional view schematically illustrating an example of a metal magnetic particle according to the present disclosure.

FIG. 1 is a cross-sectional view schematically illustrating an example of a metal magnetic particle according to the present disclosure.

As illustrated in FIG. 1, a metal magnetic particle 1 is provided with an oxide layer on a surface of an alloy particle 10 containing Fe and Si.

The oxide layer is a first oxide layer 20, a second oxide layer 30, a third oxide layer 40, and a fourth oxide layer 50 from the alloy particle 10 side.

The alloy particle contains Fe and Si.

A weight percentage of the Si in the alloy particle is preferably equal to or larger than about 1.5 parts by weight and equal to or smaller than about 8.0 parts by weight (i.e., from about 1.5 parts by weight to about 8.0 parts by weight) with respect to 100 parts by weight of a total weight of the Fe and the Si.

When the weight percentage of the Si in the alloy particle is smaller than about 1.5 parts by weight, an effect of improving soft magnetic characteristics is poor. On the other hand, when the weight percentage of the Si in the alloy particle is larger than about 8.0 parts by weight, saturation magnetization is largely decreased, and direct-current superposition characteristics are reduced.

The alloy particle may contain Cr in addition to the Fe and the Si.

The alloy particle preferably contains smaller than about 1.0 part by weight of Cr with respect to 100 parts by weight of the total weight of the Fe and the Si, more preferably contains equal to or smaller than about 0.9 parts by weight of Cr, and still more preferably does not contain Cr. When the Cr content of Cr is small, a saturation magnetic flux density is improved, and thus the direct-current superposition characteristics are improved.

The alloy particle may contain the same element as impurity contained in pure iron as an impurity component. Examples of the impurity component include C, Mn, P, S, Cu, Al, and the like.

The oxide layer includes the first oxide layer, the second oxide layer, the third oxide layer, and the fourth oxide layer from the side of the alloy particle.

The oxide layer herein means a layer in which both oxygen and metal elements (including silicon (Si) in the metal elements herein) are counted in line analysis of element content to be described below. When both oxygen and silicon are counted, it is considered that oxide containing silicon is present, and when both oxygen and iron (Fe) are counted, it is considered that oxide containing iron is present.

The first oxide layer is a layer in which Si content takes a local maximum value in line analysis of element content (hereinafter also simply referred to as line analysis) using a scanning transmission electron microscope (STEM)-energy dispersive X-ray spectroscopy (EDX). The second oxide layer is a layer in which Fe takes a local maximum value in the line analysis. The third oxide layer is a layer in which Si content takes a local maximum value in the line analysis. The fourth oxide layer is a layer in which Fe content takes a local maximum value in the line analysis.

Boundaries among the first oxide layer, the second oxide layer, the third oxide layer, and the fourth oxide layer are defined as follows.

In the line analysis of element content using the STEM-EDX, the first oxide layer is defined from a point where the Fe content and the Si content are reversed (a first boundary) to a midpoint between a point where the Si content takes a local maximum value and a point where the Fe content takes a local maximum value (a second boundary).

In the line analysis of element content using the STEM-EDX, the second oxide layer is defined from the second boundary to a midpoint between a point at which the Fe content takes a local maximum value and a point at which the Si content takes a local maximum value (a third boundary).

In the line analysis of element content using the STEM-EDX, the third oxide layer is defined from the third boundary to a midpoint between a point at which the Si content takes a local maximum value and a point at which the Fe content takes a local maximum value (a fourth boundary).

The fourth oxide layer is defined from the fourth boundary in the line analysis of element content using the STEM-EDX to a point where O content (oxygen content) in the line analysis becomes about 34% of the maximum value (a fifth boundary).

Note that the “content” of each element in the line analysis of element content using the STEM-EDX is a count number (also referred to as a net count) of X-rays unique to each element, and does not indicate a weight ratio or an atomic ratio.

Further, the magnification in the STEM-EDX is 400000 times.

A thickness of the first oxide layer is preferably equal to or larger than about 3.0 nm and equal to or smaller than about 10 nm (i.e., from about 3.0 nm to about 10 nm), and more preferably equal to or larger than about 4.0 nm and equal to or smaller than about 7.0 nm (i.e., from about 4.0 nm to about 7.0 nm).

In the line analysis of element content using the STEM-EDX, a ratio of the Fe content to the Si content (Fe content/Si content) at the point where the Si content of the first oxide layer takes the local maximum value is preferably equal to or larger than about 0.10 and equal to or smaller than about 0.30 (i.e., from about 0.10 to about 0.30), and more preferably equal to or larger than about 0.14 and equal to or smaller than about 0.20 (i.e., from about 0.14 to about 0.20).

A thickness of the second oxide layer is preferably larger than or equal to about 3.0 nm and smaller than or equal to about 8.0 nm (i.e., from about 3.0 nm to about 8.0 nm), and more preferably larger than or equal to about 4.0 nm and smaller than or equal to about 7.0 nm (i.e., from about 4.0 nm to about 7.0 nm).

In the line analysis of element content using the STEM-EDX, a ratio of the Fe content to the Si content (Fe content/Si content) at the point where the Fe content of the second oxide layer takes the local maximum value is preferably equal to or larger than about 9.0 and equal to or smaller than about 13 (i.e., from about 9.0 to about 13), and more preferably equal to or larger than about 10 and equal to or smaller than about 12 (i.e., from about 10 to about 12).

A thickness of the third oxide layer is preferably equal to or larger than about 2.5 nm and equal to or smaller than about 8.0 nm (i.e., from about 2.5 nm to about 8.0 nm), and more preferably equal to or larger than about 3.5 nm and equal to or smaller than about 6.0 nm (i.e., from about 3.5 nm to about 6.0 nm).

In the line analysis of element content using the STEM-EDX, a ratio of the Fe content to the Si content (Fe content/Si content) at the point where the Si content of the third oxide layer takes the local maximum value is preferably equal to or larger than about 1.0 and equal to or smaller than about 2.0 (i.e., from about 1.0 to about 2.0), and more preferably equal to or larger than about 1.4 and equal to or smaller than about 1.8 (i.e., from about 1.4 to about 1.8).

A thickness of the fourth oxide layer is preferably equal to or larger than about 4.0 nm and equal to or smaller than about 10 nm (i.e., from about 4.0 nm to about 10 nm), and more preferably equal to or larger than about 5.0 nm and equal to or smaller than about 7.5 nm (i.e., from about 5.0 nm to about 7.5 nm).

In the line analysis of element content using the STEM-EDX, a ratio of the Fe content to the Si content (Fe content/Si content) at the point where the Fe content of the fourth oxide layer takes the local maximum value is preferably equal to or larger than about 23 and equal to or smaller than about 28 (i.e., from about 23 to about 28), and more preferably equal to or larger than about 24 and equal to or smaller than about 26 (i.e., from about 24 to about 26).

Note that the thicknesses of the first oxide layer, the second oxide layer, the third oxide layer, and the fourth oxide layer are determined by performing the line analysis of each of three positions at which a length of an outer periphery of the metal magnetic particle is equally divided by three in an enlarged image obtained by observing a cross-section of the metal magnetic particle by the STEM-EDX, determining the thicknesses of the respective layers, and then determining averages of the thicknesses at the three positions. Further, a ratio of the Fe content to the Si content in each layer (Fe content/Si content) is also determined as an average value of the measured values obtained by the line analysis at the three positions in a similar manner.

In the metal magnetic particle according to the present disclosure, it is preferable that the adjacent oxide layers have different crystallinity.

For example, when the first oxide layer is amorphous, the second oxide layer is preferably crystalline, the third oxide layer is preferably amorphous, and the fourth oxide layer is preferably crystalline.

By joining the amorphous oxide layer and the crystalline oxide layer, the electrical resistance at the joining interface is increased. Therefore, when the crystallinity is different in the adjacent layers, the insulation resistance can be increased.

The crystallinity of each layer can be confirmed by whether or not a periodic light and dark pattern appears in an FFT image obtained by performing Fourier-transformation on an STEM image. In a case of being crystalline, the periodic light and dark pattern appears in the FFT image, and in a case of being amorphous, the periodic light and dark pattern does not appear in the FFT image.

Inductor

An inductor according to preferred embodiments of the present disclosure includes the metal magnetic particles according to preferred embodiments of the present disclosure.

The inductor according to the present disclosure includes the metal magnetic particles according to the present disclosure, and thus has a high withstand voltage and excellent direct-current superposition characteristics.

The inductor according to the present disclosure includes, for example, the metal magnetic particles according to the present disclosure and a winding disposed around the metal magnetic particles.

The material, the wire diameter, the number of turns, and the like of the winding are not particularly limited, and may be selected according to the desired characteristics.

The metal magnetic particles configuring the inductor according to the present disclosure may be formed into a predetermined shape. The metal magnetic particles formed into the predetermined shape are also referred to as a metal magnetic core. Therefore, an inductor including a metal magnetic core made of the metal magnetic particles according to the present disclosure and a winding disposed around the metal magnetic core is also the inductor according to the present disclosure.

Method for Manufacturing Metal Magnetic Particle

A method for manufacturing a metal magnetic particle according to preferred embodiments of the present disclosure includes mixing a raw material particle having, on a surface of an alloy particle containing Fe and Si, an Si oxide film and an Fe oxide film from a side of the alloy particle with Si alkoxide and alcohol, forming a coating film forming particle formed with a coating film containing silicon oxide by hydrolyzing drying the Si alkoxide, and forming an oxide layer on the surface of the alloy particle by performing heat treatment on the coating film forming particle in an oxidizing atmosphere. An average thickness of the coating film is larger than or equal to 10 nm and smaller than or equal to 14 nm (i.e., from 10 nm to 14 nm).

In the method for manufacturing the metal magnetic particle according to the present disclosure, the coating film containing the silicon oxide is formed on the surface of the raw material particle having the Si oxide film and the Fe oxide film on the surface of the alloy particle, and the coating film is subjected to the heat treatment in the oxidizing atmosphere. As a result, it is considered that the Si oxide film serves as the first oxide layer, the Fe oxide film serves as the second oxide layer, and the coating film serves as the third oxide layer. Further, it is considered that Fe in the Fe oxide film diffuses to the outside of the coating film to be oxidized, thereby forming the fourth oxide layer containing Fe.

From this, the metal magnetic particle according to the present disclosure can be obtained by using the method for manufacturing the metal magnetic particle according to the present disclosure.

In order to obtain the third oxide layer distinguished from the second oxide layer and the fourth oxide layer, the average thickness of the coating film is preferably equal to or larger than about 10 nm. On the other hand, when the average thickness of the coating film is smaller than or equal to about 14 nm, Fe in the Fe oxide film easily diffuses to the outside of the coating film, and the fourth oxide layer can be easily formed.

Mixing Raw Material Particle with Si Alkoxide and Alcohol

First, a raw material particle having, on a surface of an alloy particle containing Fe and Si, an Si oxide film and an Fe oxide film from the alloy particle side is prepared.

A method for forming the Si oxide film and the Fe oxide film on the surface of the alloy particle is not particularly limited, but a method for gradually oxidizing a fine particle of an FeSi alloy obtained by a water atomization method or the like is exemplified.

The gradual oxidation is a process in which the surface of the alloy particle is intentionally oxidized for the purpose of suppressing excessive oxidation of the alloy particle, and a surface oxide film functioning as a protective film for oxidation is formed.

For example, for a dried FeSi alloy particle placed in a non-oxidizing atmosphere, an oxygen concentration in the atmosphere is gradually increased to gradually oxidize a surface of the FeSi alloy particle, and the Si oxide film and the Fe oxide film are formed on the surface of the alloy particle.

The alloy particle to be used in the method for manufacturing the metal magnetic particle according to the present disclosure include the Si and the Fe.

An average particle diameter of the raw material particles is not particularly limited, but D50=a diameter equal to or larger than about 1 μm and equal to or smaller than about 10 μm (i.e., from about 1 μm to about 10 μm) is preferably satisfied.

Note that D50 is a particle diameter at which a cumulative volume of the alloy particle measured by a laser diffraction method is about 50%.

Subsequently, the raw material particle is mixed with Si alkoxide and alcohol.

The Si alkoxide is preferably tetraethoxysilane.

When the Si alkoxide is tetraethoxysilane, it is easy to form a coating film having a uniform thickness on the surface of the raw material particle.

In addition, the alcohol is preferably ethanol.

When the raw material particle is mixed with the Si alkoxide and the alcohol, it is preferable to add polyvinylpyrrolidone as a water-soluble polymer. In addition, it is preferable to add an aqueous ammonia solution as a basic catalyst. The Si alkoxide is likely to undergo hydrolysis in presence of a basic catalyst and water.

Forming Coating Film Forming Particle

Subsequently, the Si alkoxide is hydrolyzed and dried, thereby producing a coating film forming particle in which a coating film containing silicon oxide is formed.

At this time, an average thickness of the coating film provided on the surface of the raw material particle is set to be equal to or larger than about 10 nm and equal to or smaller than about 14 nm (i.e., from about 10 nm to about 14 nm).

Performing Heat Treatment on Coating Film Forming Particle

Subsequently, the coating film forming particle is subjected to heat treatment in an oxidizing atmosphere, thereby forming an oxide layer on the surface of the alloy particle.

A temperature of the heat treatment is preferably higher than or equal to about 600° C. and lower than or equal to about 740° C. (i.e., from about 600° C. to about 740° C.).

When the temperature of the heat treatment is lower than about 600° C., Fe in the Fe oxide film may not diffuse to the outer side portion of the coating film. On the other hand, when the temperature of the heat treatment exceeds about 740° C., the oxidation reaction of the alloy particle proceeds, and magnetic characteristics may deteriorate in some cases.

Method for Manufacturing Metal Magnetic Core

A method for manufacturing a metal magnetic core according to preferred embodiments of the present disclosure includes mixing raw material particles each of which has, on a surface of an alloy particle containing Fe and Si, an Si oxide film and an Fe oxide film from a side of the alloy particle with Si alkoxide and alcohol, forming coating film forming particles each of which is formed with a coating film containing silicon oxide by hydrolyzing and drying the Si alkoxide, molding the coating film forming particles, and forming an oxide layer on the surface of each of the alloy particles by performing heat treatment on a molded body of the coating film forming particles in an oxidizing atmosphere. An average thickness of the coating film is larger than or equal to 10 nm and smaller than or equal to 14 nm (i.e., from 10 nm to 14 nm).

In the method for manufacturing the metal magnetic core according to the present disclosure, by performing the heat treatment in the oxidizing atmosphere on the molded body obtained by molding the coating film forming particles obtained by forming the coating film containing the silicon oxide on the surface of each of the raw material particles each of which has the Si oxide film and the Fe oxide film from the side of the alloy particle, similarly to the method for manufacturing the metal magnetic particle according to the present disclosure, the Fe oxide film can be diffused to an outer side portion of the coating film to form the fourth oxide layer. In addition, it is possible to obtain the metal magnetic core in which the alloy particles are joined to each other by the oxide layer.

Among the respective processes configuring the method for manufacturing the metal magnetic core according to the present disclosure, the processes other than the molding are common to those of the method for manufacturing the metal magnetic particle according to the present disclosure.

In the molding, granulated powder produced by mixing binder resin, a solvent, and the coating film forming particles and then removing the solvent may be molded, or a mixture of the binder resin, the solvent, and the coating film forming particles may be directly molded.

As the binder resin, epoxy resin, silicone resin, phenol resin, polyamide resin, polyimide resin, polyphenylene sulfide resin, ethyl cellulose, and the like are preferable.

Examples of the solvent include a polyvinyl alcohol aqueous solution, terpineol, and the like.

The molded body produced in the molding preferably has a shape corresponding to the shape of the metal magnetic core to be obtained.

Examples of the shape of the metal magnetic core include a substantially rod-like shape, a substantially cylindrical shape, a substantially ring shape, a substantially rectangular parallelepiped shape, and the like.

A molding pressure in the molding is not particularly limited, but it is preferably equal to or larger than about 100 MPa and equal to or smaller than about 700 MPa (i.e., from about 100 MPa to about 700 MPa).

In the method for manufacturing the metal magnetic core according to the present disclosure, the molding preferably includes laminating and pressing a green sheet containing the coating film forming particles.

When the molding includes laminating and pressing the green sheet including the coating film forming particles, a distance between the alloy particles becomes close to each other in the molded article before the heat treatment, and thus it is easy to obtain a metal magnetic core in which the alloy particles are joined to each other by the oxide layer.

The green sheet containing the coating film forming particles can be obtained by, for example, mixing a solvent containing binder resin and coating film forming particles to produce slurry, molding the slurry into a thin film by a doctor blade method or the like, and then removing the solvent.

As the binder resin and the solvent, similar materials to those in the production of the granulated powder may be suitably used.

The green sheet containing the coating film forming particles may be formed with a coil pattern or a part thereof by a conductive paste or the like.

The molding may include printing with and drying paste containing the coating film forming particles.

EXAMPLES

Hereinafter, examples in which the metal magnetic particles, the inductor, the method for manufacturing the metal magnetic particle, the metal magnetic core, and the method for manufacturing the metal magnetic core according to the present disclosure are more specifically disclosed will be described. It should be noted that the present disclosure is not limited to only these examples.

Example 1

Fe:Si=93.5:6.5 (a weight ratio) of FeSi alloy particle was obtained by the water atomization method.

A surface of the obtained FeSi alloy was observed with an STEM, and it was confirmed that two oxide layers each of which has an average thickness of about 10 nm were formed on a surface of the FeSi alloy particle.

By using XPS analysis, element analysis was performed in a depth direction from the surface of the FeSi alloy particle, and it was confirmed that there was a layer containing Fe on the surface side of the FeSi alloy particle, and in an inner side portion of the layer, there was a layer containing Si.

From the above-description, it was confirmed that a silicon oxide film having an average thickness of about 10 nm and an iron oxide film having an average thickness of about 10 nm were formed on the surface of the FeSi alloy particle.

The obtained FeSi alloy particle was used as the raw material particle.

Polyvinylpyrrolidone K30 was added to ethanol added with an aqueous ammonia solution and the FeSi alloy particles, and stirred to obtain a mixed solution. Tetraethoxysilane was added dropwise to the obtained mixed solution, and the mixed solution after the dropwise addition was stirred for 60 minutes to obtain slurry. The slurry was filtered, washed with acetone, and then dried at 60° C. to obtain coating film forming particles.

The coating film forming particles were embedded in resin, then a cross section thereof was polished and processed to obtain a thin piece with a focused ion beam (FIB) apparatus [SMI3050SE manufactured by Seiko Instruments Inc.], and thus a sample for STEM observation was produced. The sample for STEM observation was observed at a magnification of about 400000 times with an STEM (HD-2300A manufactured by Hitachi High-Technologies Corporation), and it was confirmed that the average thickness of the coating film was about 11 nm.

100 parts by weight of the obtained coating film forming particles were mixed with 6 parts by weight of epoxy resin and a polyvinyl alcohol aqueous solution to be dried, and then sieved to obtain granulated powder. The granulated powder was filled in a mold having a donut shape and having an outer diameter of 20 mm and an inner diameter of 10 mm, the mold was pressurized at 60° C. for 10 seconds at a pressure of 500 MPa, and the coating film forming particles were molded into a ring shape having an outer diameter of about 20 mm, an inner diameter of about 10 mm, and a thickness of about 2 mm.

The obtained ring was degreased and fired in a firing furnace, and a molded body (metal magnetic core) of metal magnetic particles as a fired body was obtained. The degreasing was performed in the atmosphere, and the temperature was raised to 400° C. at a temperature rising rate of 40° C./h, held for 30 minutes, and then naturally cooled. The firing was performed in the atmosphere, and the temperature was raised to 690° C. that was a peak temperature in 40 minutes, held for 20 minutes, and then naturally cooled. Three rings were produced, one ring was used for measurement by the STEM-EDX, one ring was used for measurement of the withstand voltage performance, and one ring was used for measurement of the relative permeability and the direct-current superposition characteristics.

Line Analysis by STEM-EDX

Figure 2:
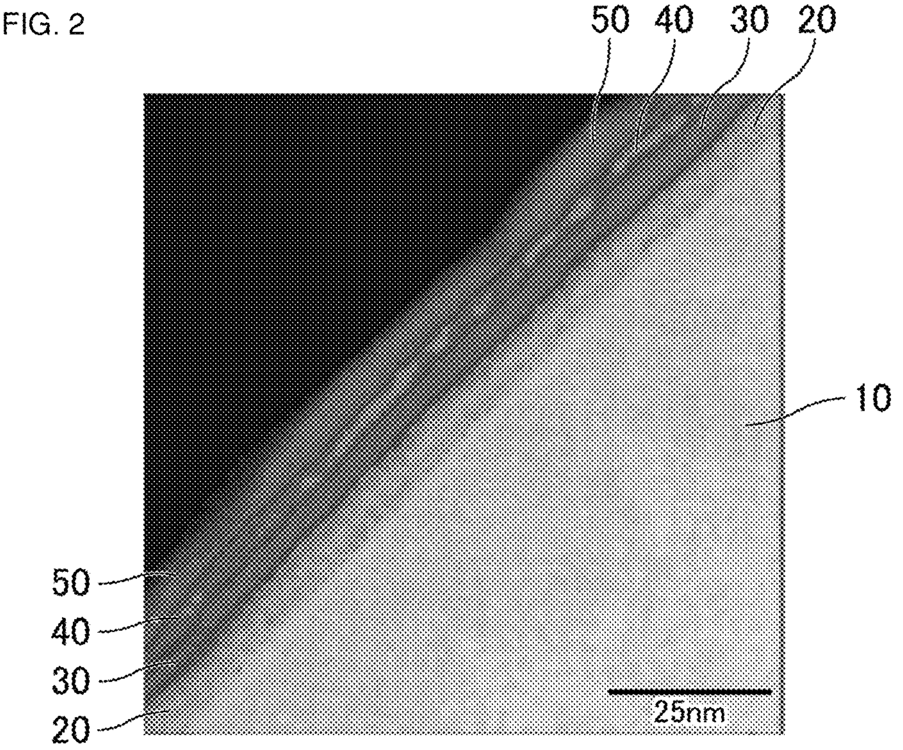
FIG. 2 is an STEM image of Example 1.
Figure 3:
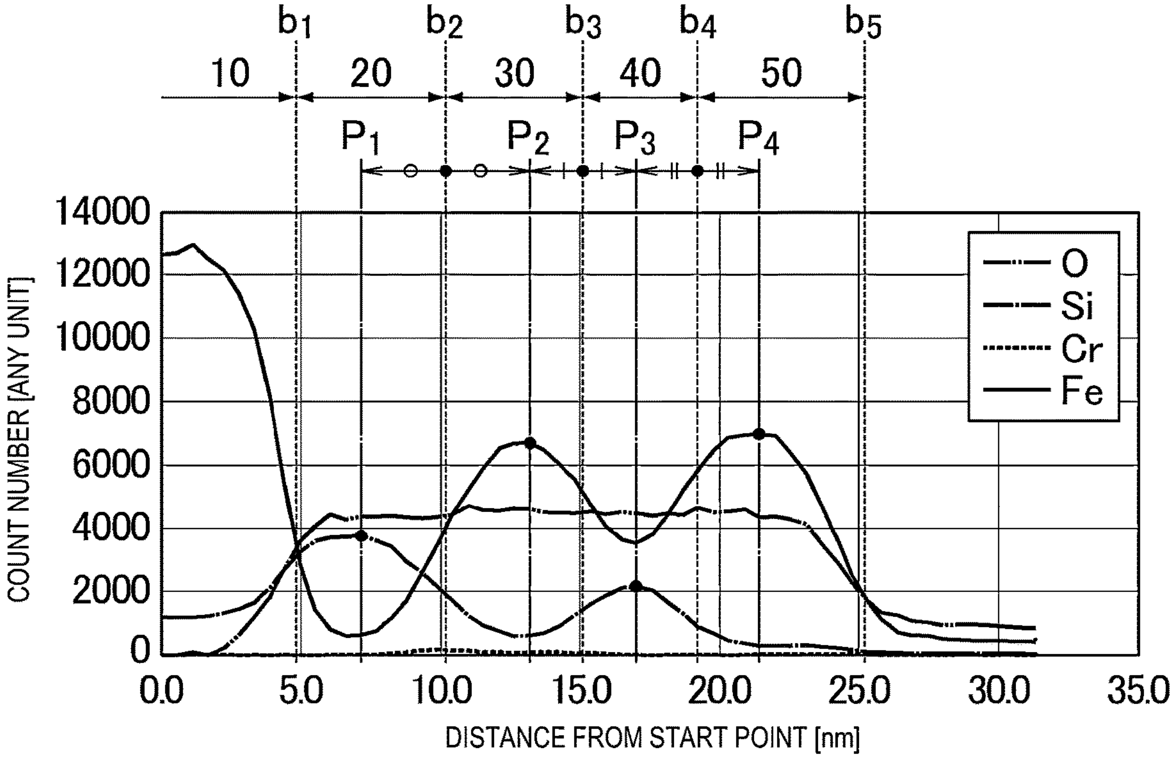
FIG. 3 is a diagram illustrating a result of line analysis in Example 1.

After the obtained ring was embedded in resin, the cross section thereof was polished and processed by an FIB to obtain a thin piece, and thus a sample for STEM observation was prepared. By using the STEM and EDX (GENESIS XM4 manufactured by EDAX Inc.), line analysis of the sample for STEM measurement is performed. A start point was the inside of an alloy particle, and element analysis was performed toward an outer side portion (the oxide layer). The magnification of the STEM was 400000 times. The STEM image is shown in FIG. 2, and the result of the line analysis is illustrated in FIG. 3. Note that the vertical axis represents a count number [any unit] of characteristic X-rays (K-lines) of each element, and the horizontal axis represents a distance [nm] from a start point. The horizontal axis was measured at intervals equal to or shorter than 0.9 nm.

From FIG. 2, it was confirmed that the first oxide layer 20, the second oxide layer 30, the third oxide layer 40, and the fourth oxide layer 50 are disposed in this order on the surface of the alloy particle 10.

Note that it was also confirmed from the STEM image that the alloy particles were joined to each other with the first oxide layer, the second oxide layer, the third oxide layer, or the fourth oxide layer interposed therebetween.

From FIG. 3, the thickness of the first oxide layer was 5.5 nm, the thickness of the second oxide layer was 4.9 nm, the thickness of the third oxide layer was 4.1 nm, and the thickness of the fourth oxide layer was 6.2 nm.

From FIG. 3, it was confirmed that the oxide layer had the first oxide layer 20 in which the Si content took a local maximum value, the second oxide layer 30 in which the Fe content took a local maximum value, the third oxide layer 40 in which the Si content took a local maximum value, and the fourth oxide layer 50 in which the Fe content took a local maximum value. Further, it was confirmed that the alloy particle and the oxide layer contained almost no Cr.

The ratio of the Fe content to the Si content at the point where the Si content in the first oxide layer took the local maximum value (Fe content/Si content) was 0.16, the ratio of the Fe content to the Si content at the point where the Fe content in the second oxide layer took the local maximum value (Fe content/Si content) was 11, the ratio of the Fe content to the Si content at the point where the Si content in the third oxide layer tool the local maximum value (Fe content/Si content) was 1.6, and the ratio of the Fe content to the Si content at the point where the Fe content in the fourth oxide layer took the local maximum value (Fe content/Si content) was 25.

In FIG. 3, the alloy particle 10 is from the start point to a first boundary $b_1$ at which the Fe content and the Si content are reversed.

The first oxide layer 20 is from the first boundary $b_1$ to a second boundary $b_2$ which is a midpoint between a point $P_1$ where the Si content takes the local maximum value and a point $P_2$ where the Fe content takes the local maximum value.

The second oxide layer 30 is from the second boundary $b_2$ to a third boundary $b_3$ which is a midpoint between the point $P_2$ where the Fe content takes the local maximum value and a point $P_3$ where the Si content takes the local maximum value.

The third oxide layer 40 is from the third boundary $b_3$ to a fourth boundary $b_4$ which is a midpoint between the point $P_3$ where the Si content takes the local maximum value and a point $P_4$ where the Fe content takes the local maximum value.

The fourth oxide layer 50 is from the fourth boundary $b_4$ to a fifth boundary $b_5$ which is a point at which the O content becomes 34% of the maximum value.

Further, it was confirmed from the FFT image obtained by performing Fourier-transformation on the STEM image that the first oxide layer was amorphous, the second oxide layer was crystalline, the third oxide layer was amorphous, and the fourth oxide layer was crystalline.

Measurement of Withstand Voltage Performance

The withstand voltage performance was measured in a thickness direction of the ring. The measurement was performed with a digital ultrahigh-resistance/micro-ammeter (R8340A manufactured by ADVANTEST CORPORATION) in a state where the probe attached thereto pinched the ring, to record a resistance value [Ω] when a predetermined voltage was applied. The applied voltage was swept, from 1 V to 10 V in increments of 1 V, and from 10 V to 1000 V in increments of 10 V, until the resistance value was lower than $10^5$ [Ω]. The applied voltage [V] immediately before the resistance value was lower than $10^5$ [Ω] was recorded, and the electric field intensity [V/mm] was calculated by dividing the thickness of the ring by the recorded voltage. The results are shown in Table 1.

Note that, in a case where the resistance value was not lower than $10^5$ [Ω] even at 1000 V that was the maximum applied voltage of the measurement apparatus, the electric field intensity was denoted as equal to or larger than a value obtained by dividing the resistance value [Ω] at 1000 V by the thickness of the ring in the Table 1.

Measurement of Relative Permeability

The ring was impregnated with epoxy-based resin to improve mechanical strength, and then, the relative permeability was measured by using an impedance analyzer (E4991A manufactured by Keysight Technologies, Inc.). The relative permeability employed a value at 1 MHz. The results are shown in Table 1.

Measurement of Direct-Current Superposition Characteristics

Further, a copper wire having a diameter of 0.35 mm was wound 24 times around the ring, and the direct-current superposition characteristics were measured by using an LCR meter (4284A manufactured by Keysight Technologies, Inc.). A direct current of 0 to 30 A was applied to the copper wire to obtain an L value, the relative permeability (μ value) was calculated from the obtained L value, and a current value (Isat@-20%) at which the u value was decreased to 80% of the initial value was obtained. From Isat@-20%, the ring size, and the number of turns of the copper wire, Hsat@-20% [kA/m] that was a magnetic field in which the u value was 80% of the initial value was obtained. The results are shown in Table 1.

Note that the ring in which the copper wire is wound is also the inductor according to the present disclosure.

Examples 2 and 3

The ring was produced in a similar procedure to Example 1 except that a pressure for molding the coating film forming particles was changed to each of 300 MPa and 100 MPa, and the electric field intensity, the resistance value, the relative permeability, and the Hsat@-20% were obtained. The results are shown in Table 1.

Comparative Examples 1 to 3

The ring was produced in a similar procedure to each of Examples 1 to 3 except that the raw material particles were used instead of the coating film forming particles, and the electric field intensity, the resistance value, the relative permeability, and the Hsat@-20% were measured. The results are shown in Table 1.

TABLE 1

| | Manufacturing Conditions | | | Characteristics | | |
|---|---|---|---|---|---|---|
| | Average Thickness of Coating Film [nm] | Molding Pressure [MPa] | Heat Treatment Temperature [° C.] | Electric Field Intensity [V/mm] | Relative Permeability | Hsat@-20% [kA/m] |
| Example 1 | 11 | 500 | 690 | Equal to or More Than 790 | 22.1 | 13.5 |
| Example 2 | 11 | 300 | 690 | Equal to or More Than 779 | 16.3 | 17.3 |

TABLE 1-continued

| | Manufacturing Conditions | | | Characteristics | | |
|---|---|---|---|---|---|---|
| | Average Thickness of Coating Film [nm] | Molding Pressure [MPa] | Heat Treatment Temperature [° C.] | Electric Field Intensity [V/mm] | Relative Permeability | Hsat@-20% [kA/m] |
| Example 3 | 11 | 100 | 690 | Equal to or More Than 620 | 11.2 | 25.5 |
| Comparative Example 1 | — | 500 | 690 | 488 | 24.3 | 10.1 |
| Comparative Example 2 | — | 300 | 690 | 327 | 17.8 | 13.9 |
| Comparative Example 3 | — | 100 | 690 | 273 | 11.8 | 23.4 |

From the results in Table 1, it can be seen that the metal magnetic particles according to the present disclosure have high electric field intensities and excellent withstand voltage performance as compared with Comparative Examples 1 to 3 in which the coating film forming particles are not formed.

Figure 4:
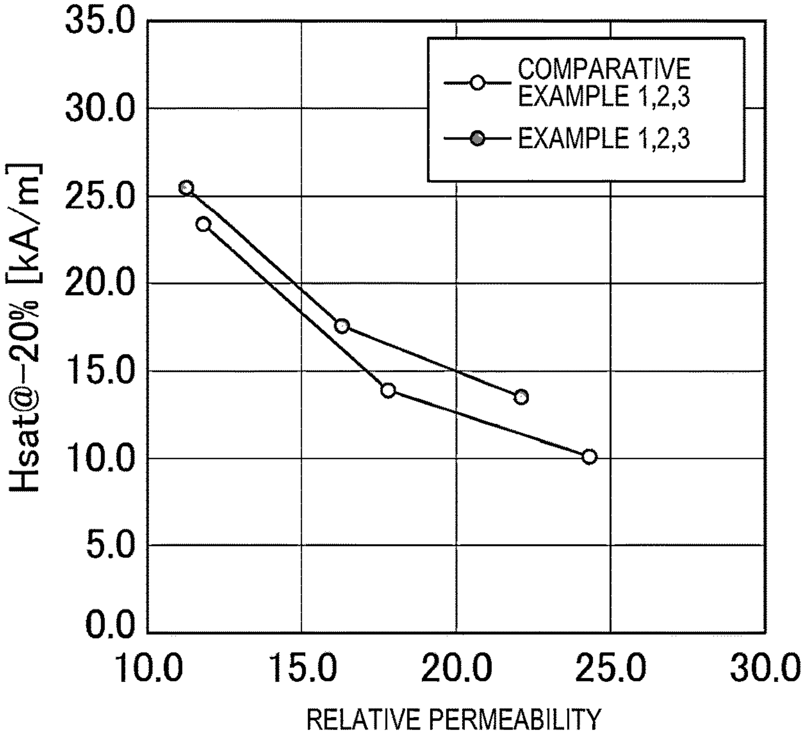
FIG. 4 is a graph illustrating a relationship between a direct current magnetic field Hsat@-20% [kA/m] (the vertical axis) when a value of relative permeability becomes equal to or smaller than 80% of an initial value and the relative permeability (the horizontal axis) in each of examples and comparative examples.

In addition, FIG. 4 illustrates a relationship between the relative permeability (horizontal axis) and Hsat@-20% [kA/m] (vertical axis) in each of Examples and Comparative Examples. From FIG. 4, it was confirmed that plot positions of the metal magnetic particles according to Examples 1 to 3 shifted to the upper right side, compared to the metal magnetic particles according to Comparative Examples 1 to 3. From this, it can be confirmed that the value of Hsat@-20% tends to be improved when the relative permeability is substantially the same, and it can be found that the metal magnetic particle according to the present disclosure has excellent direct-current superposition characteristics.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A method for manufacturing a metal magnetic particle, the method comprising:
- mixing a raw material particle having, on a surface of an alloy particle containing Fe and Si, a Si oxide film and an Fe oxide film from a side of the alloy particle with Si alkoxide and alcohol;
- forming a coating film forming particle formed with a coating film containing silicon oxide by hydrolyzing and drying the Si alkoxide; and
- forming an oxide layer on the surface of the alloy particle by performing heat treatment on the coating film forming particle in an oxidizing atmosphere, wherein
- an average thickness of the coating film is from 10 nm to 14 nm,
- a layer in which Fe content takes a local maximum value is formed over a layer in which Si content takes a local maximum value and the layer in which Fe content takes the local maximum value also includes Si, and
- in the layer in which Si content takes the local maximum value, Si content is greater than Fe content at a point where Si content takes the local maximum value.

2. The method for manufacturing the metal magnetic particle according to claim 1, wherein
- a temperature of the heat treatment is from 600° C. to 740° C.

3. The method for manufacturing the metal magnetic particle according to claim 1, wherein
- the Si alkoxide is tetraethoxysilane.

4. The method for manufacturing the metal magnetic particle according to claim 2, wherein
- the Si alkoxide is tetraethoxysilane.

5. A method for manufacturing a metal magnetic core, the method comprising:
- mixing raw material particles each of which has, on a surface of an alloy particle containing Fe and Si, a Si oxide film and an Fe oxide film from a side of the alloy particle with Si alkoxide and alcohol;
- forming coating film forming particles each of which is formed with a coating film containing silicon oxide, by hydrolyzing and drying the Si alkoxide;
- molding the coating film forming particles; and
- forming an oxide layer on a surface of each of the alloy particles by performing heat treatment on a molded body of the coating film forming particles in an oxidizing atmosphere, wherein
- an average thickness of the coating film is from 10 nm to 14 nm,
- in the oxide layer, a layer in which Fe content takes a local maximum value is formed over a layer in which Si content takes a local maximum value and the layer in which Fe content takes the local maximum value also includes Si, and
- in the layer in which Si content takes the local maximum value, Si content is greater than Fe content at a point where Si content takes the local maximum value.

6. The method for manufacturing the metal magnetic core according to claim 5, wherein
- the molding includes laminating and pressing a green sheet containing the coating film forming particles.

7. The method for manufacturing the metal magnetic core according to claim 5, wherein
- the molding includes printing with and drying paste containing the coating film forming particles.

8. The method for manufacturing the metal magnetic core according to claim 5, wherein
- a temperature of the heat treatment is equal to or higher than 600° C. and equal to or lower than 740° C.

9. The method for manufacturing the metal magnetic core according to claim 5, wherein
- the Si alkoxide is tetraethoxysilane.

10. The method for manufacturing the metal magnetic core according to claim 6, wherein
- a temperature of the heat treatment is equal to or higher than 600° C. and equal to or lower than 740° C.

11. The method for manufacturing the metal magnetic core according to claim 7, wherein a temperature of the heat treatment is equal to or higher than 600° C. and equal to or lower than 740° C.

12. The method for manufacturing the metal magnetic core according to claim 6, wherein the Si alkoxide is tetraethoxysilane.

13. The method for manufacturing the metal magnetic core according to claim 7, wherein the Si alkoxide is tetraethoxysilane.

* * * * *